United States Patent
Zhang et al.

(10) Patent No.: US 8,560,647 B2
(45) Date of Patent: Oct. 15, 2013

(54) CONTROLLER PLACEMENT FOR SPLIT ARCHITECTURE NETWORKS

(75) Inventors: Ying Zhang, San Jose, CA (US); Neda Beheshti, San Jose, CA (US); Mallik Tatipamula, San Jose, CA (US)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 156 days.

(21) Appl. No.: 13/186,272

(22) Filed: Jul. 19, 2011

(65) Prior Publication Data

US 2013/0024579 A1    Jan. 24, 2013

(51) Int. Cl.
*G06F 13/00*    (2006.01)

(52) U.S. Cl.
USPC ............................ 709/220; 709/218; 709/238

(58) Field of Classification Search
USPC ......... 709/220, 221, 222, 238, 249, 250, 217, 709/218
See application file for complete search history.

(56) References Cited

U.S. PATENT DOCUMENTS

| | | | |
|---|---|---|---|
| 8,139,505 B2 * | 3/2012 | Guo et al. | 370/254 |
| 8,351,456 B2 * | 1/2013 | Kadous et al. | 370/445 |
| 8,364,515 B1 * | 1/2013 | Procopiuc | 705/7.29 |

OTHER PUBLICATIONS

"OpenFlow: Enabling Innovation in Campus Networks"; Nick Mckeown, et al., openflowswith.org, Mar. 14, 2008; 6 pages.
"Probalistic Decentralized network Management"; Marcus Brunner, et al., *2009 IEEE; International Symposium on Integrated Network Management*; pp. 25-32.
"Design and Implementation of Application Based Routing Using OpenFlow"; Othman Othman, et al., 8 pages.
"On the Optimal Placement of Web Proxies in the Internet: the Linear Topology", Bo Li et al., Published by Chapman & Hall 1998, 11 pages.
"On the Placement of Web Server Replicas", L. Qiu, et al., in *Proc. IEEE INFOCOM*, 2001, 10 pages.
"Constrained Mirror Placement on the Internet", E. Cronin, et al., in *Proc. IEEE INFOCOM*, pp. 31-40 2001.

* cited by examiner

Primary Examiner — Viet Vu
(74) Attorney, Agent, or Firm — Blakely, Sokoloff, Taylor & Zafman (57) ABSTRACT

A network topology design system to determine placement of a set of controllers within a network with a split architecture, the placement of the set of controllers selected to minimize disruption of the split architecture network caused by a link failure, a switch failure or a connectivity loss between the set of controllers and the data plane components. The system performs a method including graphing a topology of the split architecture network, determining a set of clusters of nodes within the graph by applying an agglomerative clustering process or a partitive clustering process, determining, a centroid for each cluster in the set of clusters, assigning one of the set of controllers to each network element corresponding to a determined centroid in the graph, and assigning each controller to control a set of network elements corresponding to a cluster in the graph.

13 Claims, 6 Drawing Sheets

CONTROLLER PLACEMENT FOR SPLIT ARCHITECTURE NETWORKS

FIELD OF THE INVENTION

The embodiments of the invention are related to the organization and design of networks. Specifically, the embodiments of the invention relate to a method and system for determining placement of controllers for switches in a split architecture network with control de-coupled from forwarding.

BACKGROUND

OpenFlow is an architecture and protocol recently developed in academia. In this new architecture, the control plane is de-coupled from the forwarding plane in a given router and generally in a network. The functionality of a conventional router is reorganized as a distributed system. An OpenFlow network contains a network-wide control platform, running on one or more servers in the network. The control platform oversees and manages a set of simple switches.

Conventional router architecture follows an integrated design where the control plane and data forwarding engine are tightly coupled in the same box, which results in an overly complicated control plane and complex network management. Due to the high complexity, equipment vendors and network operators are reluctant to deploy changes to these routers and the network itself is fragile and hard to manage. This is generally seen as creating a large burden on network administrators and a high barrier of entry for new protocol and technology developments related to networking.

Figure 1:
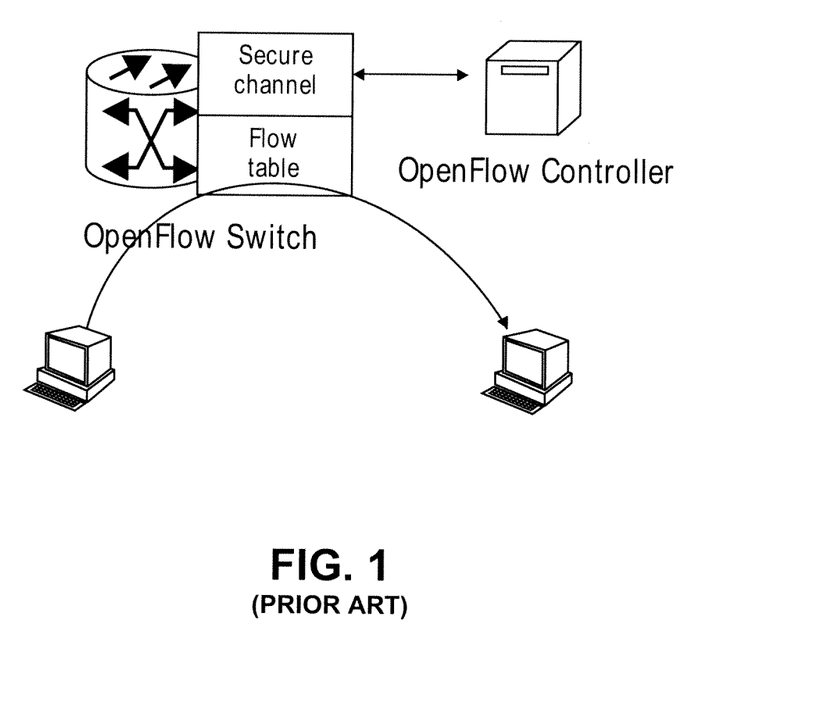
FIG. 1 is a diagram of one embodiment of an example architecture for a simple OpenFlow network.

OpenFlow defines a network element model where the two central components are the controller and the OpenFlow switch as depicted in FIG. 1. A controller is able to communicate with an OpenFlow Switch via the OpenFlow protocol in order to control the switch. The OpenFlow control protocol provides a vendor agnostic interface for controlling network forwarding elements. OpenFlow enables the separation of the control plane and data plane in routing and switching gear. The OpenFlow interface allows flexible deployment of the network control plane software and simplifies the control plane on network forwarding hardware. The control plane can be deployed on a centralized controller that controls multiple forwarding elements, rather than having a distributed control plane with components that run on each switch. This split architecture of OpenFlow enables increased innovation in control plane software and simplified operations and management.

The architecture of an OpenFlow switch is shown also in FIG. 1. The OpenFlow switch consists of three major components, the flow table, a secure channel to the control process, and the OpenFlow protocols. Switches are modeled as a flow table in which there are three columns: rules, actions, and counters. The rules column defines the flow. Rules are matched against the headers of incoming packets. If a rule matches, the actions from the action column are applied to the packet and the counters in the counter column are updated. The OpenFlow protocol is carried over the secure channel and specifically transport layer security (TLS) is used for the implementation of that secure channel. The OpenFlow protocol provides an open and standard method for an OpenFlow switch to communicate to a controller.

The split architecture of an OpenFlow network can includes multiple OpenFlow switches interconnecting with each other and a small number of controllers that instruct the switches' forwarding behavior. The main task of an OpenFlow switch is to forward packets from ingress port to an egress port, according to the rules in the flow table programmed by the remote controller. Each flow entry contains a set of actions such as forwarding packets to a given port, modifying certain bits in the packet header, or encapsulating packets to the controller, or simply dropping the packets. For the first packet in a new flow, the switch normally forwards the packet to the controller to trigger the new flow entry being programmed. It can also be used to forward all slow-path packets to a controller for processing such as Internet control message protocol (ICMP) packets. The concept of a flow can be defined broadly, e.g., a TCP connection, or all traffic from a particular MAC address or IP address.

The controller adds and removes flow-entries from the Flow Table. It defines the interconnection and routing among the set of data plane switches. It also handles network state distribution, such as collecting information from the switches and distributing routing instructions to them. It can also be programmed to support any new addressing, routing, and complex packet processing applications. The controller is the "brain" of the network. An OpenFlow switch needs to connect to at least one controller to function correctly. A simple network topology that consists of two controllers and a set of OpenFlow switches is illustrated in FIG. 2.

Figure 2:
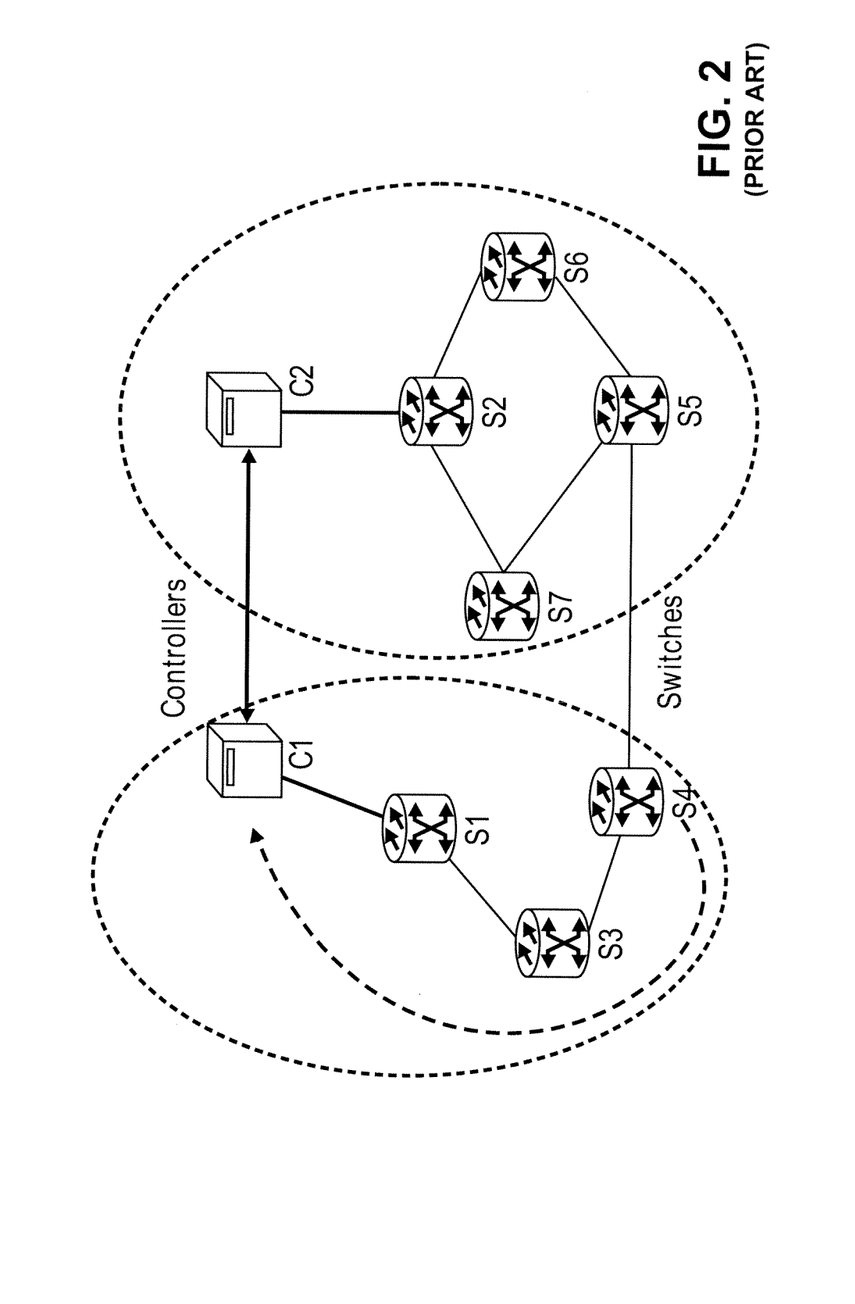
FIG. 2 is a diagram of one embodiment of an example OpenFlow network with multiple controllers.

FIG. 2 illustrates a network that consists of seven OpenFlow switches and two controllers. There can be a fixed binding between controller and switches, which is the shortest path between the switch and its closest controller. A static binding between controller and the switch is also possible, e.g., C1 is the assigned controller for S3. S3 can only be controlled by C1 even if it is also reachable by C2. In this example, there is a separate link between two controllers C1 and C2 to exchange the network states between them. Each controller uses the same network constructed using the OpenFlow switches to communicate with those OpenFlow switches that the respective controller has been assigned to control. For instance, S7 goes through S3 and S1 to reach the controller C1, marked as a dotted line. It is also assumed that fixed routing has been set up. The subscripts denote the flow entries in each switch. An entry on S4 is programmed by C1 to match any HTTP flow from IP1 and forward to port 1 connected to S7.

SUMMARY

A method implemented by a network topology design system, the network topology design system including a processing device, the method to determine placement of a set of controllers within a network with a split architecture where control plane components of the split architecture network are executed by the set of controllers and the control plane components are separate from data plane components of the split architecture network, the placement of the set of controllers selected to minimize disruption of the split architecture network caused by a link failure, a switch failure or a connectivity loss between the set of controllers and the data plane components, the method comprising the steps of: graphing a topology of the split architecture network, with each link in the split architecture network represented as an edge in a graph and each network element in the split architecture network represented as a node; determining a set of clusters of nodes within the graph by applying an agglomerative clustering process or a partitive clustering process, either process comprising the further steps of, applying a cost function to measure a length of inter-cluster connecting edges, and modifying the set of clusters to minimize the length of inter-cluster connecting edges; determining, by the network topology design system, a centroid for each cluster in the set of clusters, wherein the centroid is a most central node in each cluster, determining the centroid comprising the further steps of, applying a cost function to measure intra-cluster edge length for each node in each cluster, and selecting a lowest cost node in each cluster to be the centroid for the cluster; assigning one of the set of controllers to each network element corresponding to a determined centroid in the graph; and assigning each controller to control a set of network elements corresponding to a cluster in the graph.

A network with a split architecture where a set of control plane components of the split architecture network are executed by a set of controllers and the control plane components are separate from a set of data plane components of the split architecture network, wherein a placement of the set of controllers is selected to minimize disruption of the split architecture network caused by a link failure, a switch failure or a connectivity loss between the set of controllers and the data plane components, the network comprising: a first set of network elements interconnected by a set of communication links, each network element in the first set of network elements executing a switch that is controlled by and in communication with one controller from the set of controllers, the first set of network elements organized as a set of clusters; and a second set of network elements interconnected with the first set of network elements, each network element in the second set of network elements executing one controller from the set of controllers, wherein a position of each network element in the second set of network elements within the split architecture network is central within a respective cluster in the set of clusters and minimizes inter-cluster link length.

BRIEF DESCRIPTION OF THE DRAWINGS

The present invention is illustrated by way of example, and not by way of limitation, in the figures of the accompanying drawings in which like references indicate similar elements. It should be noted that different references to "an" or "one" embodiment in this disclosure are not necessarily to the same embodiment, and such references mean at least one. Further, when a particular feature, structure, or characteristic is described in connection with an embodiment, it is submitted that it is within the knowledge of one skilled in the art to affect such feature, structure, or characteristic in connection with other embodiments whether or not explicitly described.

DETAILED DESCRIPTION

In the following description, numerous specific details are set forth. However, it is understood that embodiments of the invention may be practiced without these specific details. In other instances, well-known circuits, structures and techniques have not been shown in detail in order not to obscure the understanding of this description. It will be appreciated, however, by one skilled in the art, that the invention may be practiced without such specific details. Those of ordinary skill in the art, with the included descriptions, will be able to implement appropriate functionality without undue experimentation.

The operations of the flow diagrams will be described with reference to the exemplary embodiments of FIG. 4. However, it should be understood that the operations of the flow diagrams in FIGS. 3, 5 and 6 can be performed by embodiments of the invention other than those discussed with reference to FIG. 4, and the embodiments discussed with reference to FIG. 4 can perform operations different than those discussed with reference to the flow diagrams of FIGS. 3, 5 and 6.

The techniques shown in the figures can be implemented using code and data stored and executed on one or more electronic devices (e.g., an end station, a network element, server or similar electronic devices). Such electronic devices store and communicate (internally and/or with other electronic devices over a network) code and data using non-transitory machine-readable or computer-readable media, such as non-transitory machine-readable or computer-readable storage media (e.g., magnetic disks; optical disks; random access memory; read only memory; flash memory devices; and phase-change memory). In addition, such electronic devices typically include a set of one or more processors coupled to one or more other components, such as one or more storage devices, user input/output devices (e.g., a keyboard, a touch screen, and/or a display), and network connections. The coupling of the set of processors and other components is typically through one or more busses and bridges (also termed as bus controllers). The storage devices represent one or more non-transitory machine-readable or computer-readable storage media and non-transitory machine-readable or computer-readable communication media. Thus, the storage device of a given electronic device typically stores code and/or data for execution on the set of one or more processors of that electronic device. Of course, one or more parts of an embodiment of the invention may be implemented using different combinations of software, firmware, and/or hardware.

As used herein, a network element (e.g., a router, switch, bridge, or similar networking device.) is a piece of networking equipment, including hardware and software that communicatively interconnects other equipment on the network (e.g., other network elements, end stations, or similar networking devices). Some network elements are "multiple services network elements" that provide support for multiple networking functions (e.g., routing, bridging, switching, Layer 2 aggregation, session border control, multicasting, and/or subscriber management), and/or provide support for multiple application services (e.g., data collection).

As used herein resilience is the ability to provide and maintain an acceptable level of service in the face of faults and challenges to normal operation As used herein failure probability is the frequency with which an engineered system or component fails, expressed as the number of failures per hour, or the probability of each node fails in the long time.

The embodiments include a process for selecting an optimal or improved controller placement to minimize disruption caused by failure of links, network elements or similar problems in the split architecture network. The types of failures in a split architecture network can be categorized into three types, link failure, switch failure and special cases.

A link failure indicates that traffic traversing a link can no longer be transferred over the link. The failure can be either of a link between two switches or of a link between one controller and the switch to which it connects. In most cases, these links fail independently.

A switch failure indicates that the corresponding network element is unable to originate, respond, or forward any packet. Switch failures can be caused by software bugs, hardware failures, misconfigurations, and similar issues. In most cases, these switches fail independently.

Special cases include connectivity loss between a switch and a controller: A switch can lose connectivity to its controller due to failures on the intermediate links or nodes along the path between the switch and the controller. In one embodiment, whenever a switch cannot communicate with its assigned controller, the switch will discard all the packets on the forwarding plane managed by the controller, even though the path on the forwarding plane is still valid. In other embodiments, a subset of the traffic can be forwarded on forwarding plane or similar limited functionality can continue until a connection with an assigned controller or another controller is re-established. Therefore, this can be considered as a special case of switch failure.

These different types of failures can be understood in reference to FIG. 2, if the link between S4 and S5 fails, then connections between any of switches S1; S3; S4 to any of switches S2; S5; S6; S7 would be interrupted. This would be an example of a link failure. Any of the switches S1-S6 can fail due to hardware of software related failure, such as a power outage of execution errors. This would be an example of switch failure. If the link between S1 and controller C1 fails, then until a backup path is built and used, S1 will lose its connection to its controller. In one embodiment, in this example of switch failure the switch invalidates all its entries, and then S1 cannot reach any other switch in the network, until it reconnects to its controller. This is like S1 itself has failed for a period of time. This is an example of a special case failure.

In one embodiment, the process of determining optimal or improved controller placement is applied to an OpenFlow type of network with control/forward de-coupled architecture. The process seeks to improve the resilience in next generation networks deployed with the split architecture, such as OpenFlow based split architecture networks. This optimization and process for improving resilience can be also useful for placing controllers in other types of networks with similar split architecture characteristics. In another embodiment, the process is applied to generalized multi-protocol label switching (GMPLS) networks. The embodiments described herein are related to the example of an OpenFlow based split architecture network, where a control platform (i.e., a set of controllers) controls the forwarding behavior of a set of simple forwarding engines, i.e., OpenFlow switches. A 'set,' as used herein refers to any positive whole number of items, including one item. The example of an OpenFlow based split architecture based network is provided by way of example and not limitation. One skilled in the art would understand that the principles and features described herein in relation to an OpenFlow based split architecture network could also be applied to other types of networks with similar characteristics, notably where a data or forwarding plane, used herein interchangeably, is spatially and functionally separated from a control plane.

The embodiments of the present invention provide a method and system for avoiding the disadvantages of the prior art. There has been little or no work widely available that studies the problem of controller placement strategies in the split architecture network context. As a result, the placement of controllers has been arbitrary or based on guess work.

Selecting the location for controller placement is not an easy task. One naive solution is to connect all controllers to all switches, forming a mesh. However, this will significantly increase the deployment cost and wiring complexity. Moreover, it is not scalable because the OpenFlow network can include a large number of switches spread across multiple geographic locations. In traditional networks, where the control plane and data place are physically integrated together, the control and data information are equally affected upon failures, since all packets are transmitted along the same path. In contrast, in a split architecture a switch in the data plane can experience a failure separate from the controller and the control plane, creating a new set of failure cases.

The problem of controller placement is one aspect of the network resilience analysis. All existing work on network resilience analysis has assumed this in-band control model, meaning that the control and data plane are always connected. However, this model is not applicable to OpenFlow networks, given the separation between the control plane and data plane. On one hand, the control plane information can be transmitted on a different path or even on a separated network. Thus, the reliability of the control plane in OpenFlow networks is no longer linked with the one of the data plane. It enables flexible control plane deployment and control-plane-driven data plane recovery mechanisms. Thus, the control plane can stay connected upon data plane failures. On the other hand, the partition between the controllers and the forwarding plane can have fatal impact on the network. When an OpenFlow switch is disconnected from its control plane, it cannot receive any instructions on forwarding new flows and is practically offline, as well.

Given the separation of control plane and data plane has this significant impact on the resilience of the network, the location of the controller in the OpenFlow network and similar networks is a large concern for any operational deployments. Therefore, optimal or improved controller placement can have a large impact on network performance and on network resilience. Existing solutions for general server placement algorithms in standard networks cannot be directly applied for the controller placement in split architecture networks. These existing server placement solutions focus on performance metrics such as minimizing delay between the server and the clients. These existing solutions formulate the server placement algorithm as an optimization problem and solve the problem using commercial linear programming software. The goals are completely different for optimizing controller placement where resilience supplants delay metrics. These existing solutions for general server placement do not maximize the network resilience. Due to the difference in optimization objectives, previous approaches are insufficient to identify the best location for controllers in a split architecture network.

The embodiments of the invention overcome these disadvantages of the prior art. Network resilience is one of the most important factors in evaluating any split architecture network design. A failure of a few milliseconds can easily result in terabyte data losses on the links of high speed transmission rate networks. From the practical deployment's perspective, the embodiments of the invention provide a controller placement process that maximizes the resilience between the controller and the OpenFlow switches.

In one embodiment, the optimization process is implemented as a software application or program written in any computer language, such as the C programming language. The embodiments of the invention have produced controller placements on network design topologies that have been tested using simulation that have produced significant observable improvements. Compared to random placement schemes, the optimized placement process can provide significant improvement in performance and resilience for the network operators to enable deployment of their network in a cost-effective manner. It can improve the resilience of split architecture networks, which can prevent hundreds of thousands of flows being affected by transient failures.

The optimization process can have embodiments that can be applied in multiple network environments. The split architecture network can be deployed for cellular backhaul to support MPLS based forwarding. In long term evolution (LTE) networks, it can be also deployed in the mobile core to route the user traffic between the MME, Serving-GW, PDN-GW and similar components of the evolved packet core (EPC). In this case, the controller can be implemented in multiple sites or multiple locations in one site. The optimization process can be used to calculate the best location for controller placement. When multiple technologies co-exist, e.g. GSM, 3G, LTE, they can share the same packet transport networks. In this example, a common set of controllers can be used to control packet switching functions for all networks together. The optimization process can be used to determine the location of a set of controllers for controlling multiple technology networks. In cloud computing, especially in data center networks, to reduce the cost of networking infrastructure, a split architecture with a set of smart controllers and a set of low-cost switches can be employed. In the data center network environment, optimization process can be applied to deploy controllers.

Figure 3:
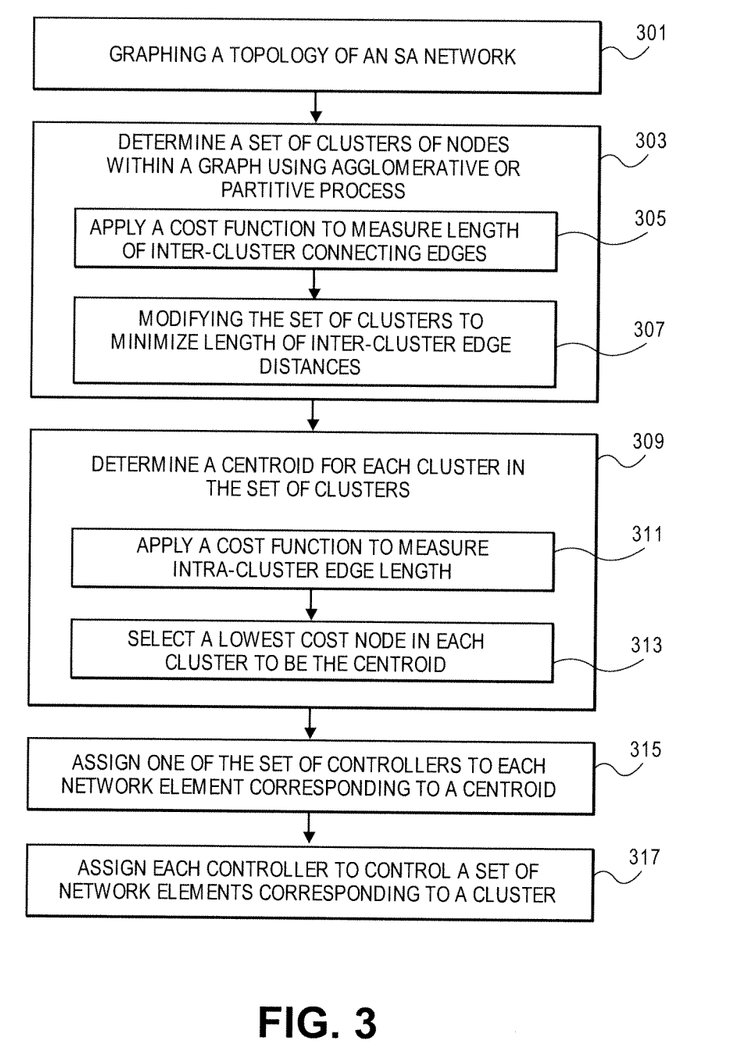
FIG. 3 is a flowchart of one embodiment of a process for optimized controller placement in a split architecture network.

FIG. 3 is a flowchart of one embodiment of a process for optimized controller placement in a split architecture network. A general formulation of the process is described in relation to FIG. 3, a more precise statement of the solution follows along with example embodiments for a min-cut process and a 'greedy' process. The optimization problem is generally treated as a graphing problem. The network for which optimal placement of controller is to be determined is represented as a graph, with each switch or network element in the graph represented by a vertex or node and each link between the switches or network elements represented as an edge in the graph. For sake of clarity the term 'node' is used hereinafter to refer to either the switch or network element or the vertex used to represent it in the graphing process. The process can be implemented as a network design system tool that is embodied in software or hardware or any combination thereof.

The graphing of the network to be optimized with controller placement can be an automated process or a manual process (Block 301). The network topology can be read in from a file, manually input, automatically discovered or similarly determined. The graphing process can map the topology into a graph and store the graph locally as a data set with any type of format or organization.

The optimization process generally seeks to determine a set of clusters of switches within the network, where each cluster is assigned a separate controller (Block 303). The clusters can be referred to as split architecture clusters (SA clusters). The process of determining the clusters can be an agglomerative or partitive process. An agglomerative process, described in greater detail herein below, starts by treating each node in a network as a separate cluster and then progressively joins these clusters to find an optimal organization of the clusters. A partitive process, described in greater detail herein below, starts by treating the whole network as a single cluster and iteratively or recursively partitioning the cluster to identify a set of optimal clusters.

These agglomerative and partitive processes both apply cost functions to measure inter-cluster or prospective inter-cluster connecting edge lengths to identify optimal groupings of the nodes (Block 305). The goal is generally to group the nodes to minimize both inter-cluster edge lengths and intra-cluster edge lengths between nodes and the controller. As the cost functions are applied, the groupings of nodes in each cluster are modified by swapping, agglomeration or partitioning to minimize these edge lengths (Block 307). The number of clusters generated can be an input parameter or a parameter that can also be optimized in these processes.

After the set of clusters has been determined, then the optimization process determines a 'centroid' for each cluster in the set of determined clusters (Block 309). A 'centroid,' as discussed in greater detail herein below, is a node in a cluster with a most central location relative to the other nodes in the cluster thereby making it an ideal location for placing a controller for the cluster. The centroid for each cluster can be determined by applying another cost function to measure intra-cluster edge lengths for all node pairs in a cluster (Block 311). The node with the lowest total or cumulative edge cost to each other node in a cluster is selected as the centroid (Block 313).

After the clusters and centroids are determined by the network design system tool using a representative graph and graph based functions and operations, the set of controllers for the split architecture network are assigned to each network element or switch that corresponds to each identified centroid (Block 315). Similarly, each controller is assigned to manage a set of switches or network elements corresponding to those nodes within the identified cluster (Block 317). This assignment process can be an automated network management process or a generated report for use by a network administrator to set up and configure the split architecture network.

Figure 4:
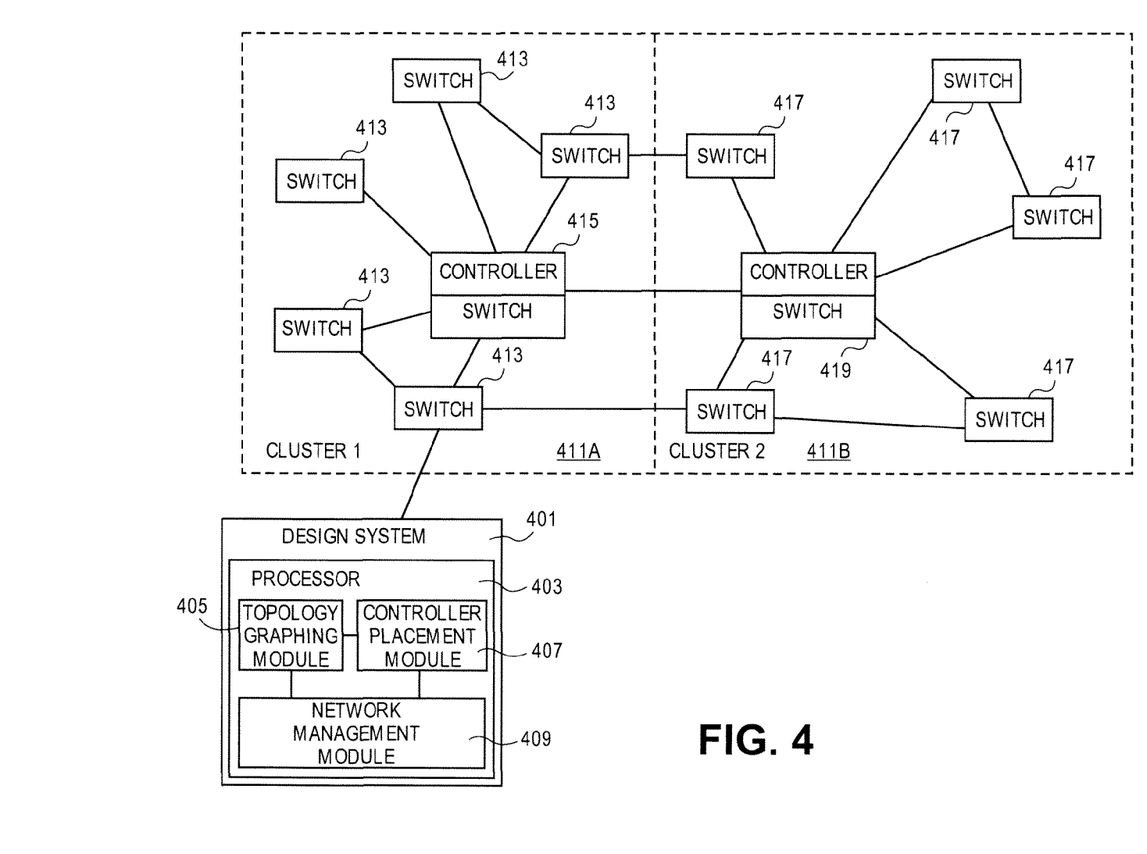
FIG. 4 is a diagram of one embodiment of a network with optimized controller placement.

FIG. 4 is a diagram of one embodiment of a network with optimized controller placement. The diagram also provides an illustration of an example network design system 401 to execute the network design system tool. The network design system 401 can be any type of computing device including a desktop computer, a server, a handheld computing device, a console device, a laptop device or similar computing device. The network design system 401 includes a set of processors to run the components of the network design system tool including a topology graphing module 405, a controller placement module 407 and similar components. In other embodiments, any or all of these modules can be implemented as a set of hardware modules of devices. The processor 403 can also execute a network management module 409 to communicate with and/or manage the split architecture network.

The topology graphing module 405 can convert a network topology into a representative graph and perform graphing functions on the representative graph to support the controller placement module 407. The controller placement module 407 operates on the graph generated by the topology graphing module 405 and directs graphing operations to implement the agglomerative or partitive process to determine the set of clusters and the centroids for these clusters. The controller placement module 407 can also generate the set of assignments of the controllers to the centroids and the switches to the respective clusters.

The network management module 409 can communicate with the controller placement module 403 and/or the topology graphing module 405 to discover the network topology for an automated process and/or to implement controller placement in an automated process. In other embodiments, the controller placement module 407 generates a report or similar output to a user for implementing a network organization and the network management module 409 can be omitted.

The illustrated split architecture network is an example implementation with example controller placement consistent with the controller placement optimization. In the example, there are two controllers 415, 419 to control their respective clusters 411A,B. Each cluster is composed of a set of switches 413, 417 that are controlled by a controller. In the illustrated example, the controllers 415, 419 are placed in a central network element in the respective cluster 411A,B that minimizes intra-cluster link lengths and maintains a minimized inter-cluster link length to thereby increase network resiliency.

Figure 5:
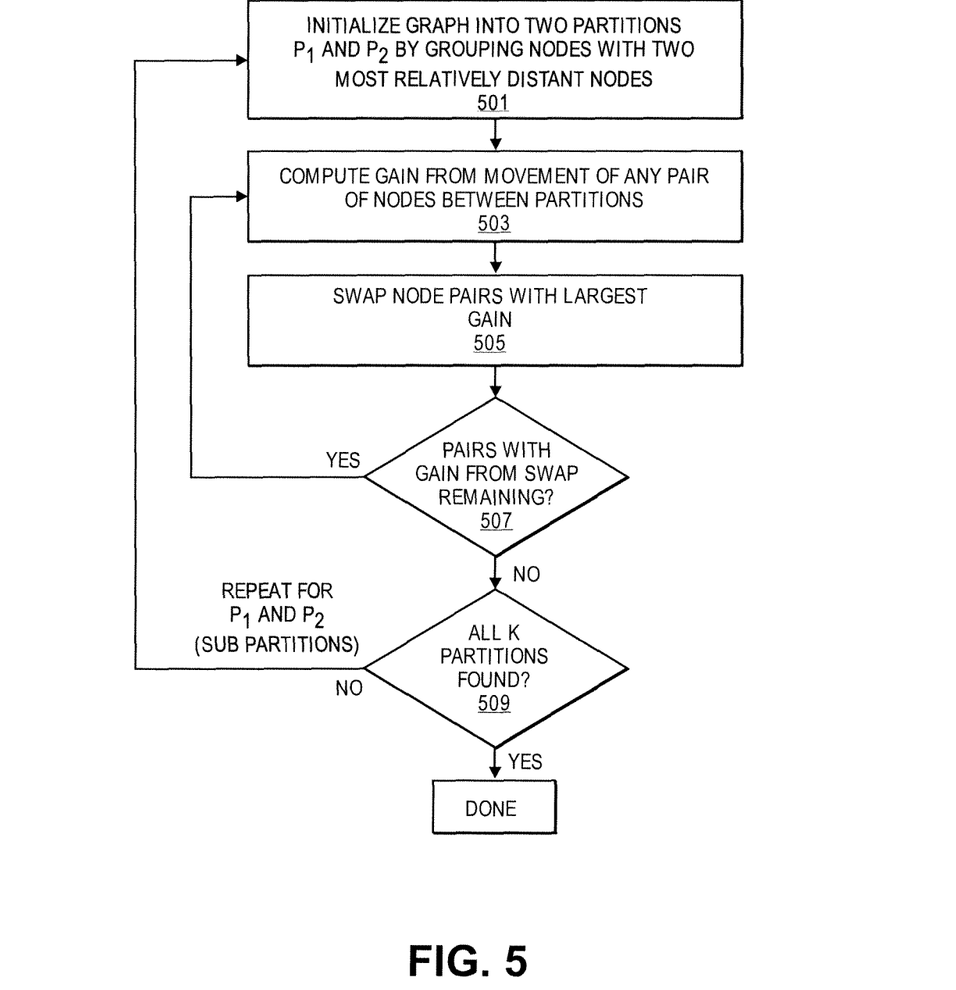
FIG. 5 is a flowchart of one embodiment of a partitive process for the controller placement process.
Figure 6:
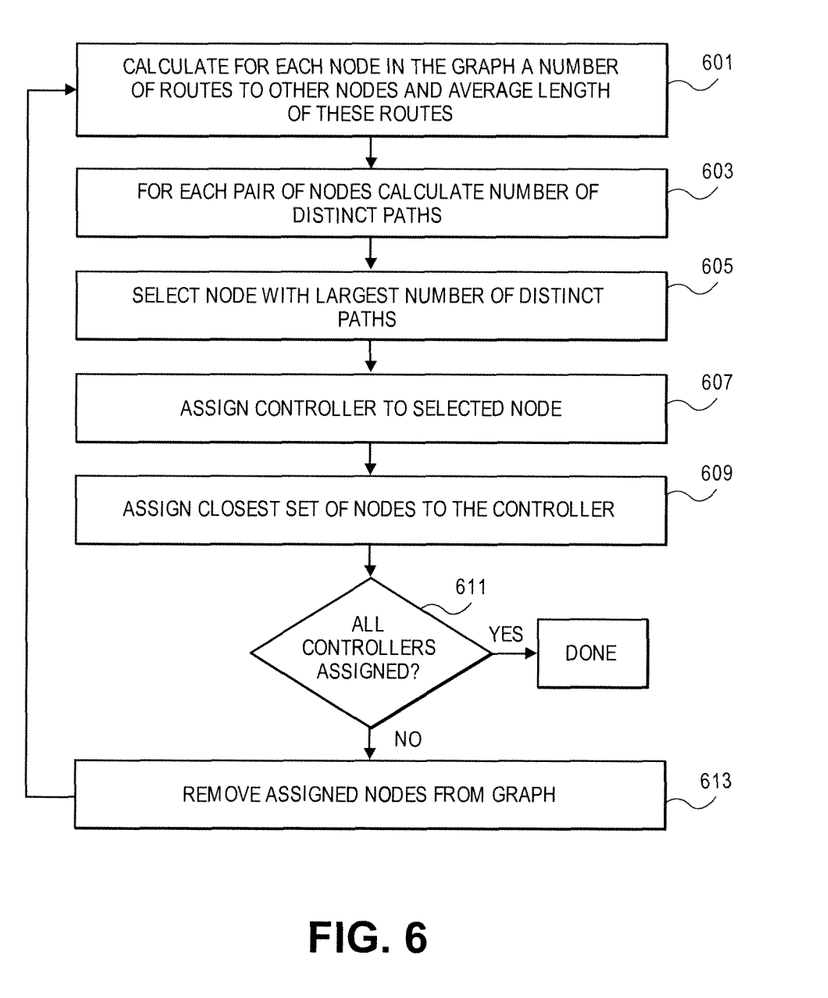
FIG. 6 is a flowchart of one embodiment of an agglomerative process for the controller placement process.

FIGS. 5 and 6 are flowcharts of more precise example formulations of the process for cluster and controller placement. The problem solved by the optimization process and the optimization process can be formulated more precisely. In this formulation, the placement problem is an optimization problem of maximizing the reliability or minimizing the failure probability. For this purpose, the following notation is used herein. Let G=(V;E) denote the basic network, with node set V representing a given network's switches, and edge set E representing network's links, which are assumed to be bidirectional. The objective is to pick a subset M (|M|=k) of the nodes, among all candidates N=|V|, and co-locate controllers with switches in these nodes so that the total failure likelihood is minimized. Once these k nodes are selected, a solution to assign switches to controllers, Map(V)=C, is also needed to achieve maximum resilience.

The optimization process solves the problem as a graph partitioning or a clustering problem. A clustering of a graph is a partition C=C0; C1; . . . ; Ck of V, i.e., ∀i; j: Ci∩Cj=ø, and C0∪C1∪ . . . ∪Ck=V. A cost function f assigns a real number to any given clustering of G. The goal is to find a clustering that minimizes a given cost function. For instance, the cost function could be the sum of the distance between each node and its centroid, or it could be the negative sum of edge weights between clusters. As discussed above, there are two ways to partition a graph: an agglomerative process, which initializes each element to belong to its own cluster and proceeds to merge clusters until a certain terminating condition is met; and a partitive process, which starts with a single cluster containing all elements and proceeds by splitting clusters.

There are two competing criteria that define a good partitioning or clustering, i.e., high intra-cluster homogeneity and low inter-cluster connectivity. If graph edges represent relationships between vertices, then the goal is to have many edges within clusters and few edges between clusters. However, if the cost function is defined to be the number of inter-cluster edges, then the problem of minimizing it is solved by picking the clustering that contains a single cluster. Thus, in addition a minimum cut requirement can be implemented to require that the partition be as balanced as possible. The minimum cut requirement considers the load on the controller, which is a practical requirement in a real network deployment. A balance property or requirement can also help provide balanced load and best resource utilization on the set of controllers. For example, if one controller in a best location is used to serve all the switches, it may easily create bandwidth bottlenecks. In describing the optimization process, the terminology of 'cuts,' 'inter-cluster edges' and 'inter-site traffic' is used interchangeably.

Another important concept in the optimization process is to find the best clusters in a well-connected group to maximize resilience. In each cluster, there is a center which we shall place the controller. The center location satisfies the constraints and maximizes the resilience metrics. The center of each partition or 'centroid' is defined: centroid(C)=1/|C|$\Sigma_{v \in C}$v. A centroid is the center of the cluster. The center is defined to be the location that achieves the best results in the cost function within the cluster. In the context of the optimization process, in order to maximize the resilience, two cost functions can be defined:

$$f = \sum_{C \in P} \sum_{u \in C} \text{length}(u, \text{centroid}(C))$$

$$g = -\frac{1}{|V|} \sum_{u \in V} \frac{1}{h} \sum_{j=1} \delta(u, nei_{uj})$$

In these two functions, P is a giving partition solution, length(u, v) is the weight of edge (u, v). In this precise definition, length(u, v) is defined to be the length of the shortest path between a switch and the centroid. $nei_{uj}$ indicates u's $j^{th}$ neighboring switch. j is used to enumerate all of u's neighbors. δ(u; v) is a binary valuable to denote if u and v are in the same partition. If u and v are in the same partition, then δ(u; v)=1, otherwise, δ(u; v)=0. Function g measures inter-cluster connectivity, which should be minimized. On the other hand, function f measures the intra-cluster difference or distance, which should also be minimized. Together, they do not favor the extreme clustering solution where all nodes are assigned to the same cluster, nor another extreme where each node is assigned to its own cluster.

Herein below two alternative embodiments are proposed. One is a full optimization process that will generate the optimal results, but the computational overhead is higher. The other is a greedy based approach. It can be implemented with low computational overhead, but the results can be sub-optimal in comparison to the other embodiment. In one example embodiment, the optimization process could be implemented on a centralized management system for network dimensioning and planning. The full optimization process can be used for a relatively small scale network with hundreds of switches and tens of controllers. The greed based approach can be used for a much larger network, with thousands of switches and hundreds of controllers, an example of such can be a data center network for cloud computing.

TABLE I

Mincut based Controller Placement procedureFind-MinCut(G=(V,E),k)
 1: Initialize cluster partition P = $P_1$, $P_2$
 2: For any pair of unmarked ($v_1 \in P_1$, $v_2 \in P_2$), compute
    g($v_1$, $v_2$) = g($v_1$) + g($v_2$) − 2w($v_1$, $v_2$)
 3: Find ($v_1$, $v_2$) with maximum g($v_1$, $v_2$), swap and
    marked.
 4: IF ∀$v_1$, $v_2$, g($v_1$, $v_2$) < 0 or iter = MAX$_1$TER or all
    nodes are marked
 5: Stop
 6: ELSE Goto Step 2.
 7: IF k > 1
 8: Find-MinCut($G_1$ = ($P_1$, $E_1$),k−1)
 9: IF k > 2
10: Find-MinCut($G_2$ = ($P_2$, $E_2$),k−2)

Table I, is one embodiment of the full optimization or 'mincut' process. The mincut process combines two objectives by first identifying the partitions with minimum cuts across boundaries. Then the process assigns the controller location to the centroid, which has the shortest paths to all switches in the same cluster. TABLE I shows the details of finding the partitions with minimum cuts. Given an initial bisection, the process tries to find a sequence of node pair exchanges that leads to an improvement of the cut size. Let P1; P2 be the bisection of graph G=(V,E), i.e., P1∪P2=V and P1∩P2=ø.

The process then selects different intermediate choice to be v. The process defines the moving gain of v to a different partition to be ext(v)−int(v), where ext(v) is the inter-cluster distance and the int(v) is the intra-cluster distance. In each iteration, the process finds the best pair of nodes v1∈P1 and v2∈P2 to exchange to maximize the gain. This process runs recursively until no further gain can be obtained by changing any pairs. Once the process identifies the partition P from the process in Table I, within each partition, the process calculates the centroid of the switches in this group. Then each controller is assigned to the centroid of its partition.

The process is further described in relation to FIG. 5. The entire graph is initialized to be partitioned to two sub-graphs, $P_1$ and $P_2$ (Block 501). There are several ways to partition the graph. One way is to use the random partitioning. A more intelligent way is to first pick two nodes with largest degree. Then the process groups other nodes to the two partitions based on their relative distances to these two large-degree nodes.

For any pairs of nodes in different partitions, compute the gain (defined in function g in Table I) if moving them to the same partition (Block 503). Instead of moving the node, the process computes the potential gain if the movement occurred hypothetically. The node remains in its original partition. The process finds the pairs of nodes that have the maximum gain and swaps them (Block 505). This is the search process to find the best partition.

After the swap, repeat step 503 and 505 until all swaps that can improve the total gain have been found. When there is no additional gain, the search process stops (Block 507). The stop condition is that if there is no more improvement (gain) that can be found, or all pairs of nodes swapping have been performed, or if the number of iterations has reached the maximum threshold. After the optimal two partition $P_1$ and $P_2$ are found, take $P_1$, and repeat the same steps from 1 to 5. Similarly, take $P_1$, and repeat, until all k partitions are found (Block 509).

TABLE II

Greedy based Controller Placement
procedureGreedy(G = (V, E), k)

| | |
|---|---|
| 1: | j = 0 |
| 2: | while j < k do |
| 3: | for all r ∈ V. v ∉ C do |
| 4: | Calculate number of routes to another node i: \|{$r_j$}\| = n(v.i) and average length len(v.i) |
| 5: | $\text{div}(v, i) = \text{Max}_l \dfrac{\sum \psi(r_j, l)}{n(v, i)}$ |
| 6: | $\text{RE}(v) = \sum\limits_{i \in V, i \neq v} \dfrac{n(v, i)}{\text{div}(v, i) \times \text{len}(v, i)}$ |
| 7: | end for |
| 8: | Select Minimum $c_j$ = RE(v). C = C ∪ {$c_j$}. j++. |
| 9: | Assign closest $\dfrac{\|V\|}{k}$ nodes to $c_j$. |
| 10: | end while |

To improve the performance, a second process can be used, which is a greedy based process shown in TABLE II. For all pairs of nodes, the second process calculates the number of distinct paths, the average path lengths and the fraction of overlapping links between them. $\psi(r_j; 1)=1$ if link 1 is in the route $r_j$. The second process chooses the one node with maximum value of RE, which finds a balance between maximizing a number of paths, minimizing path length, as well as minimizing overlapping links. In each iteration, we greedily select the node with best RE value and assign |V|/k switches to it. This is to balance the load over all controllers.

The steps are described further in relation to FIG. 6. The second process iterates k steps, which is the number of controllers or clusters to be determined. For each node in the graph, the second process calculates the number of routes to other nodes i, n(v,i), and the average length of these routes len(v,i) (Block 601). For each pair of nodes v and i, the second process calculates the metric div(v,i), which is the number distinct paths, i.e. without any sharing links between two routes, divided by the number of routes (Block 603). This metric shows the portion of routes with distinct paths.

Among all the nodes, the second process selects the node with a maximum number of distinct paths to all other nodes, at the same time, keeping the length of the paths short (Block 605). The second process, then assigns this node with one controller (Block 607). The closest set of nodes is assigned as the set of switches to be managed by this controller (Block 609). The process continues until all k controller locations are chosen (Block 611). In each iteration, those nodes that have been assigned a controller or to be managed by a controller are omitted (Block 613).

Thus, a method, system and apparatus for optimizing or improving the placement of controllers in split architecture networks have been described. It is to be understood that the above description is intended to be illustrative and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A method implemented by a network topology design system, the network topology design system including a processing device, the method to determine placement of a set of controllers within a network with a split architecture where control plane components of the split architecture network are executed by the set of controllers and the control plane components are separate from data plane components of the split architecture network, the placement of the set of controllers selected to minimize disruption of the split architecture network caused by a link failure, a switch failure or a connectivity loss between the set of controllers and the data plane components, the method comprising the steps of:

graphing a topology of the split architecture network, with each link in the split architecture network represented as an edge in a graph and each network element in the split architecture network represented as a node;

determining a set of clusters of nodes within the graph by applying an agglomerative clustering process or a partitive clustering process, either process comprising the further steps of, applying a cost function to measure a length of inter-cluster connecting edges, and modifying the set of clusters to minimize the length of inter-cluster connecting edges;

determining, by the network topology design system, a centroid for each cluster in the set of clusters, wherein the centroid is a most central node in each cluster, determining the centroid comprising the further steps of,
applying a cost function to measure intra-cluster edge length for each node in each cluster, and
selecting a lowest cost node in each cluster to be the centroid for the cluster;
assigning one of the set of controllers to each network element corresponding to a determined centroid in the graph; and
assigning each controller to control a set of network elements corresponding to a cluster in the graph.

2. The method of claim 1, wherein the partitive clustering process further comprises the steps of:
initializing the graph with two partitions determined by selecting two nodes in the graph with a largest relative distance and grouping remaining nodes with one of the two nodes based on relative distance.

3. The method of claim 1, wherein the partitive clustering process further comprising the steps of:
computing a gain for moving each node from one partition to another partition; and
swapping nodes between the one partition and another partition, where the nodes have a largest gain amongst the nodes of the graph.

4. The method of claim 3, wherein the partitive clustering process further comprises the steps of:
iterating through the swapping until all swaps that improve the gain have been performed.

5. The method of claim 1, wherein the agglomerative clustering process further comprises the steps of:
calculating for each node in the graph a number of routes to other nodes and an average length of the routes, where the routes are a set of edges between nodes.

6. The method of claim 1, wherein the agglomerative clustering process further comprises the steps of:
calculating for each node a number of distinct routes to other nodes, where edges are not shared by routes between a pair of nodes.

7. The method of claim 6, wherein the agglomerative clustering process further comprises the steps of:
selecting a first node from the graph with a largest number of distinct routes; and
assigning a controller to a network element corresponding to the first node.

8. The method of claim 7, wherein the agglomerative clustering process further comprises the steps of:
selecting a first set of nodes that are closest to the first node;
assigning a first set of network elements to be controlled by the controller, the first set of network elements corresponding to the first set of nodes.

9. The method of claim 1, wherein the agglomerative clustering process further comprises the steps of:
dividing the graph into the set of clusters of nodes, where a number of clusters in the set of clusters of nodes is a number of controllers specified by an output from a user interface unit.

10. A network with a split architecture where a set of control plane components of the split architecture network are executed by a set of controllers and the control plane components are separate from a set of data plane components of the split architecture network, wherein a placement of the set of controllers is selected to minimize disruption of the split architecture network caused by a link failure, a switch failure or a connectivity loss between the set of controllers and the data plane components, the network comprising:
a first set of network elements interconnected by a set of communication links, each network element in the first set of network elements executing a switch that is controlled by and in communication with one controller from the set of controllers, the first set of network elements organized as a set of clusters; and
a second set of network elements interconnected with the first set of network elements, each network element in the second set of network elements executing one controller from the set of controllers, wherein a position of each network element in the second set of network elements within the split architecture network is central within a respective cluster in the set of clusters and minimizes inter-cluster link length, and wherein each network element in the second set of network elements is a separate device from each network element in the first set of network elements.

11. The network of claim 10, wherein the first set of network elements form a data plane of an evolved packet core (EPC) in a long term evolution (LTE) network, and the second set of network elements form a control plane of the EPC in the LTE network.

12. The network of claim 10, wherein the first set of network elements form a set of data planes for a plurality of cellular network technologies, and the second set of network elements form a control plane for each of the plurality of cellular network technologies.

13. The network of claim 10, wherein each network element in the first set of network elements can be reassigned to another controller from the second set of network elements in response to the link failure, switch failure or connectivity loss between an assigned controller and a switch.

* * * * *